United States Patent [19]

Conrado

[11] Patent Number: 5,340,184

[45] Date of Patent: Aug. 23, 1994

[54] AERODYNAMICALLY IMPROVED TAILGATE CONSTRUCTION FOR PICKUP TRUCK

[76] Inventor: Edward Conrado, 280 Hillcrest Dr., Lakeport, Calif. 95453

[21] Appl. No.: 126,857

[22] Filed: Sep. 27, 1993

[51] Int. Cl.⁵ .............................................. B62D 25/00
[52] U.S. Cl. ..................................... 296/50; 296/57.1; 296/180.1
[58] Field of Search ...................... 296/50, 57.1, 180.1, 296/56

[56] References Cited

U.S. PATENT DOCUMENTS

| | | | |
|---|---|---|---|
| 2,561,081 | 7/1951 | Vars | 296/57.1 X |
| 2,742,317 | 4/1956 | Chandler | 296/57.1 X |
| 2,772,914 | 12/1956 | Hansen | 296/57.1 X |
| 4,475,759 | 10/1984 | Wine | 296/50 X |
| 4,691,956 | 9/1987 | Hodge | 296/57.1 X |
| 4,867,499 | 9/1989 | Stephan et al. | 296/50 |
| 4,932,705 | 6/1990 | Miller | 296/50 |
| 5,154,470 | 10/1992 | Bringman, Jr. | 296/57.1 X |

Primary Examiner—Joseph D. Pape
Attorney, Agent, or Firm—Lothrop & West

[57] ABSTRACT

A pickup truck tailgate construction is provided which enables the tailgate to be used either (1) in customary manner, with the bottom of the tailgate in hinged relation with the after end of the bed so that the tailgate can be pivoted between vertical closed position and horizontal open position or (2) in a modified fashion, in which the top of the tailgate is pivotally arranged so that the bottom of the tailgate can be positioned several inches rearwardly from the after end of the bed. The rectangular gap between the bottom of the tailgate and the adjacent after end of the bed and the triangular gaps between the opposite ends of the tailgate and the adjacent after ends of the side walls are spanned by correspondingly shaped mesh panels which allow free flow of air therethrough. Improved fuel efficiency and handling of the vehicle results from the aerodynamically enhanced construction.

10 Claims, 4 Drawing Sheets

AERODYNAMICALLY IMPROVED TAILGATE CONSTRUCTION FOR PICKUP TRUCK

BACKGROUND OF THE INVENTION

1. Field of the Invention

The invention relates generally to improvements in tailgates for pickup trucks; and, more specifically, to a tailgate construction which enlarges upon the modes of the customary tailgate so that in a new mode the aerodynamic drag is reduced, thereby improving fuel efficiency and vehicle handling characteristics while the box formed by the cargo bed, the side walls, the rear wall of the cab and the tailgate continues to provide a convenient storage capability.

2. Prior Art

Applicant is unaware of any prior art which, taken either distributively or in combination, either anticipates or renders obvious the invention claimed herein.

SUMMARY OF THE INVENTION

While pickup trucks enjoy great popularity as a utility vehicle capable of providing convenient and relatively generous storage space, the design of the customary tailgate leaves something to be desired. In other words, while the usual tailgate, being hinged at the bottom to the after end of the cargo bed, forms a secure barrier when in fully closed mode and affords ready access to the pickup box when in fully open mode, it is aerodynamically inefficient when in fully closed mode, the customary position when the vehicle is underway.

An aerodynamically undesirable airflow pattern is established as the vehicle picks up speed. The pattern results from the impingement of air passing over the top and upper sides of the cab and over the tops of the sidewalls against the transversely oriented, vertical tailgate at the after end of the cargo bed. Vigorous eddies in front of the tailgate and the dynamic impact of air against the front surface of the tailgate result in aerodynamic drag, diminishing fuel efficiency and, in extreme cases, the creation of forces acting on the after end of the pickup box which tend adversely to affect control of the vehicle.

It is therefore a major object of the invention to provide a tailgate construction which improves the aerodynamic properties of a pickup truck tailgate and thereby enhances fuel efficiency as well as vehicle handling characteristics.

The essence of the invention resides in the provision of elongated T-shaped hinge leaves which are selectively movable between a first, forwardly retracted position in which the tailgate is in fully closed mode, i.e. in the vertical attitude ordinarily assumed by a closed tailgate, and a second, rearwardly projected mode in which the tailgate is downwardly and rearwardly inclined so that the bottom of the tailgate is spaced six to eight inches, or so, rearwardly from the after end of the pickup bed while the upper corners of the tailgate are rotatably mounted on the adjacent side walls. The T-shaped hinge leaves replace the bed leaves, i.e. the leaves customarily mounted on the after end of the cargo bed.

With the T-shaped hinge leaves in the second, rearwardly projected position, the gap between the rear of the bed and the bottom of the tailgate is spanned by a rectangular panel constructed of a sturdy mesh material, such as expanded metal, hardware cloth, or the like. The triangular openings between the opposite ends of the inclined tailgate and the adjacent vertical side walls are spanned by triangular panels of similar porous sheet material.

The mesh-covered openings along the bottom and ends of the tailgate allow the rearwardly flowing air to pass through relatively unimpeded, thereby improving fuel efficiency while continuing to provide full storage capacity in the cargo bed.

Special latching arrangements are provided for securely locking and immobilizing the T-shaped hinge leaves in either the first, forwardly retracted position or in the second, rearwardly projected position.

SHORT DESCRIPTION OF THE DRAWING FIGURES

DETAILED DESCRIPTION OF A PREFERRED EMBODIMENT OF THE INVENTION

Figure 1:
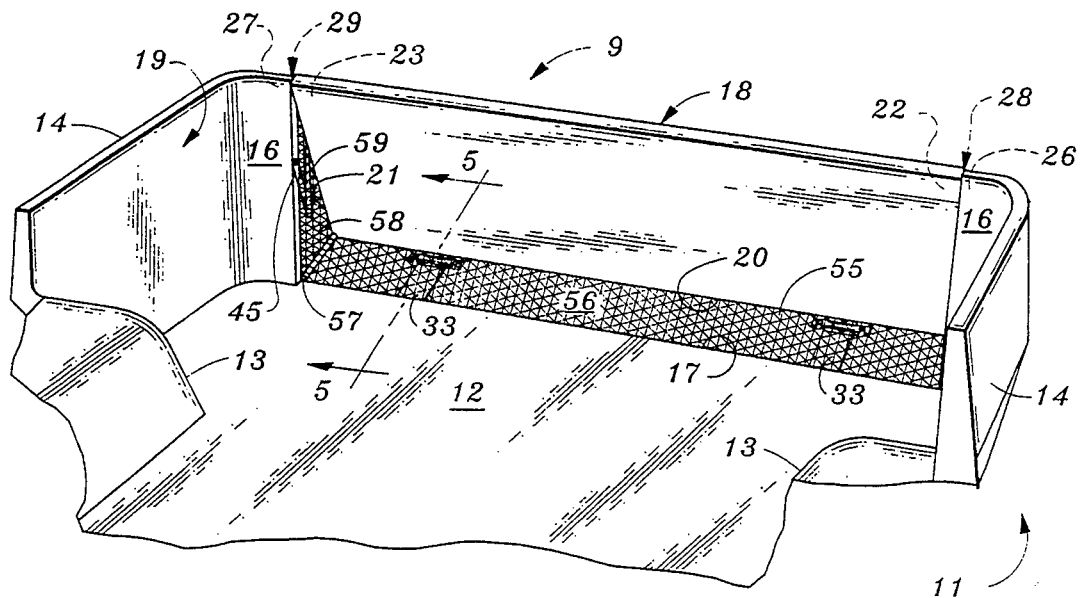
FIG. 1 is a fragmentary perspective view to a reduced scale, looking toward the right rear end of a pickup truck cargo bed showing the bottom of the tailgate in second, or projected, or inclined, position and with the mesh panels in place to allow ready through-flow of air at the after end of the bed.

While the tailgate construction of the present invention is susceptible of numerous different embodiments, depending upon the particular make of pickup truck and the various requirements of use it has successfully been incorporated in the preferred embodiment of the invention disclosed herein and generally designated by the reference numeral 9.

As is well-known, the customary pickup truck 11 includes a fore and aft elongated cargo bed 12, often interrupted by raised wells 13 to accommodate the truck's rear wheels, the cargo bed 12 being bounded on opposite lateral sides by a pair of upstanding side walls 14 extending the length of the cargo bed 12.

The after ends of the side walls 14 frequently terminate in a pair of transverse stub walls 16 substantially co-planar with the transverse after end 17 of the cargo bed 12. The rear faces of the stub walls 16 often carry the vehicle's tail, brake and backup lights 10.

In the usual pickup truck the bottom 20 of a tailgate 18 is hingeably mounted on the after end 17 of the cargo bed 12 by two or more leaf-type hinges for movement of the tailgate between a closed, vertical position in which the tailgate 18 serves as an after barrier wall for the pickup box 19 comprising the cargo bed 12, the side walls 14, the cab's rear wall 15 (see FIG. 2) and the tailgate 18 and an open, horizontal position to provide access to the box 19.

Figure 2:
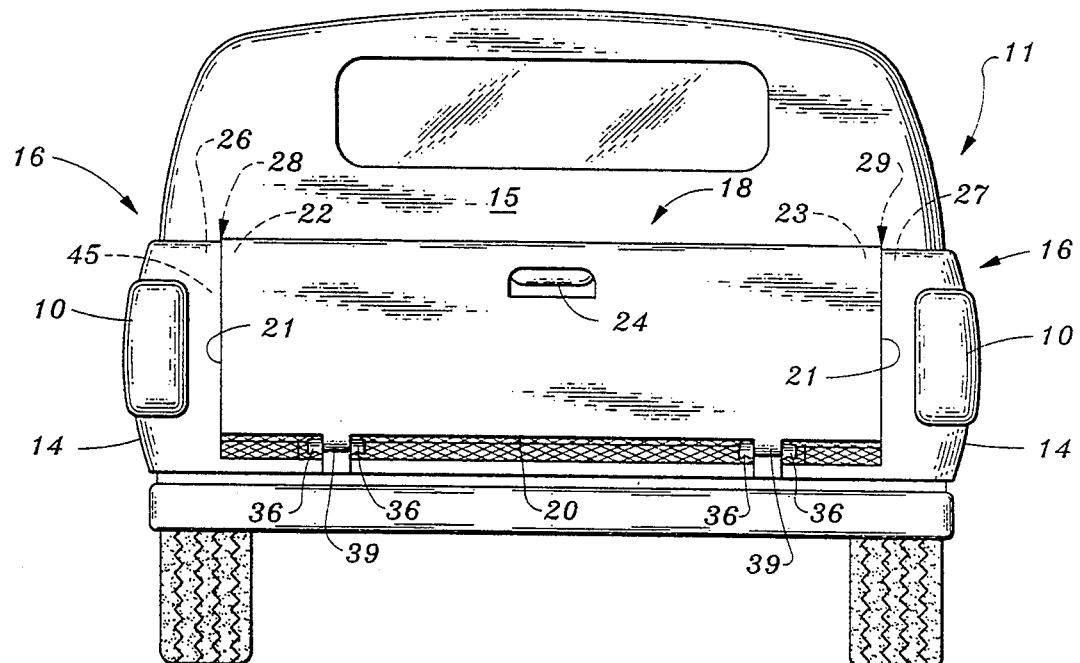
FIG. 2 is a rear elevational view of the pickup truck shown in FIG. 1.

The tailgate 18 includes opposite lateral ends 21 adapted to face the respective, adjacent ends of the stub wall 16 in closed position of the tailgate, as in FIG. 2.

The usual tailgate 18 also includes some form of locking arrangement for securing the tailgate in vertical, closed position. Such locking arrangements are conventional, vary from make to make and therefore need not be disclosed in detail.

It is believed sufficient to point out that in all makes of pickup truck known to applicant the tailgate locking arrangement includes a pair of suitable latching members 22 and 23, one on each upper end, or upper corner, of the tailgate 18 and adapted selectively to engage a mating member 26 and 27, respectively, on the adjacent one of the stub walls 16 (see FIG. 2). It is these selfsame mating members 22, 26 and 23, 27 which in the present invention, serve as tailgate pivots, the pivots being designated, respectively, by reference numerals 28 and 29.

Many present day pickup trucks utilize, for a tailgate latching structure, a pair of pivoted latching levers located adjacent the upper corners of the tailgate. The levers are adapted to engage respective latching pins located on the stub walls 16. The levers unlatch from the pins in response to linkages actuated by a lift plate 24 located near the top center of the tailgate, as appears in FIG. 2. The precise latching arrangement will vary from make to make and is therefore not shown or described in detail.

In most pickup trucks, however, the movable latching levers on the corners of the tailgate, when in engagement with the latching pins on the stub walls 16 adequately provide the necessary pivot structure 28 and 29 about which the bottom 20 of the tailgate 18 rotates when the tailgate is either opened or closed in accordance with the present embodiment of the invention.

Also pursuant to the present invention, the bed leaf of each of the two or more customary tailgate hinges, connecting the tailgate to the after end of the cargo bed, is replaced by a special T-shaped hinge leaf 32, termed for convenience herein, a T-hinge 32.

Figure 3:
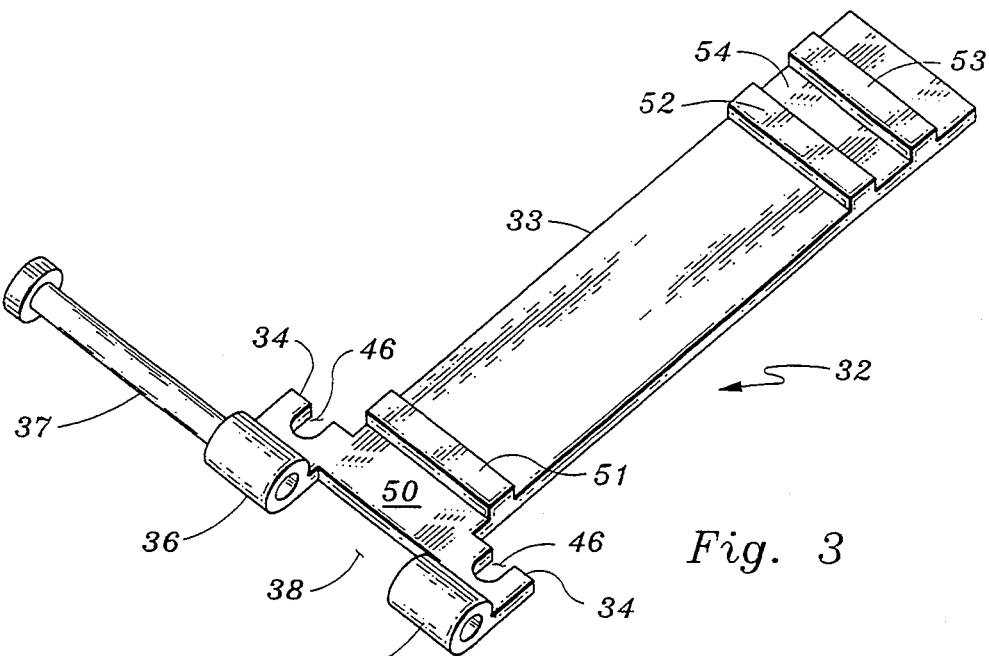
FIG. 3 is a perspective view of the special T-shaped hinge leaf including hinge knuckles, mounting plate, elongated tongue and raised limit stops on the tongue.

Each of the T-hinges 32 includes an elongated tongue 33, and a transverse mounting plate 34 carrying two or more hinge knuckles 36 for the reception of a hinge pin 37, shown partially inserted in FIG. 3. Separating the two hinge knuckles 36 is a space 38 into which is fitted a hinge knuckle 39 projecting forwardly from the tailgate leaf 31 mounted on the bottom 20 of the tailgate 18. The number of hinges connecting the tailgate and the back end of the bed will vary, depending upon the make of the vehicle; but in all cases known to applicant at least two hinges are provided.

Figure 6:
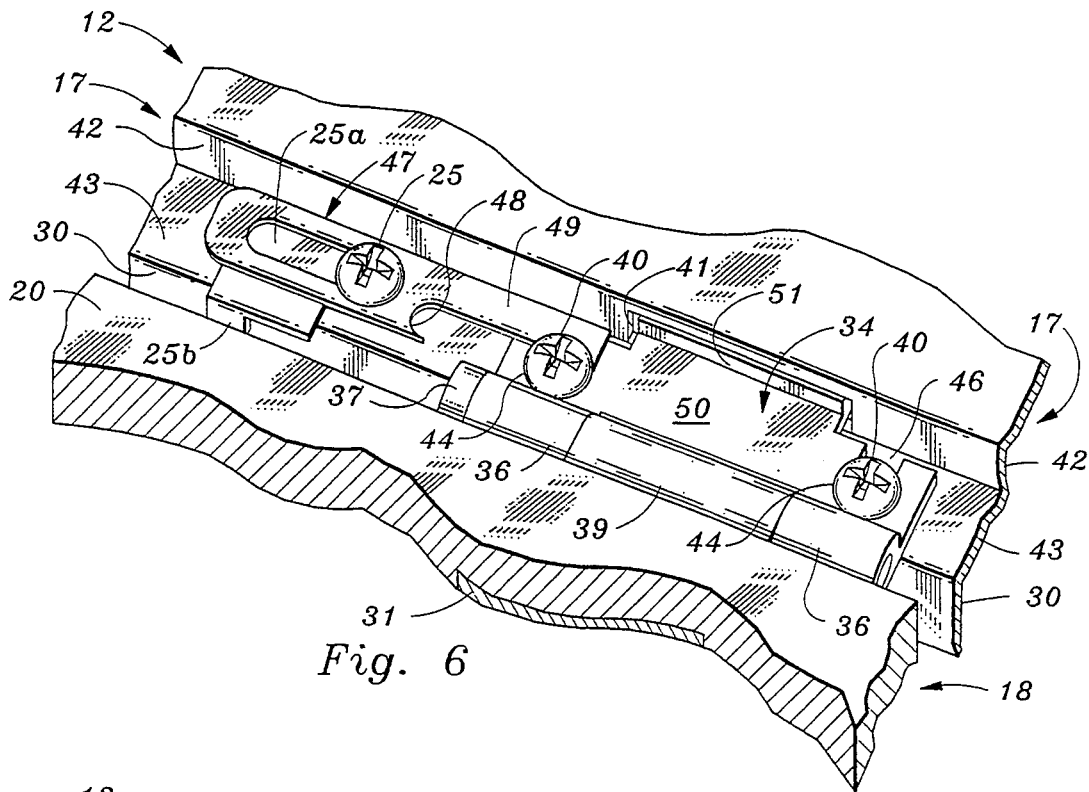
FIG. 6 is a fragmentary isometric view, to an enlarged scale of the T-shaped hinge mounting and locking structure with the T-shaped hinge in first, or forwardly retracted, position, with the sliding latch bar in open, or unlatched, location, and with the tailgate in horizontal, open position providing access to the cargo bed.
Figure 7:
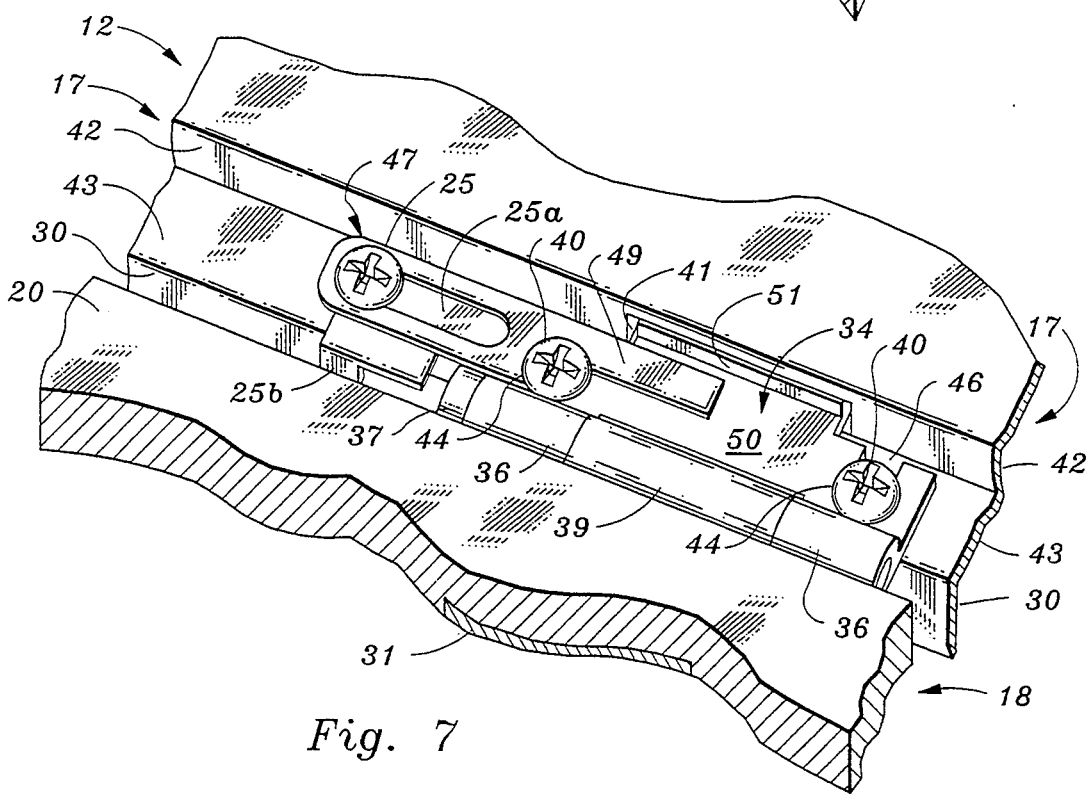
FIG. 7 is a view similar to FIG. 6 but with the sliding latch bar in closed, or latched, location.
Figure 8:
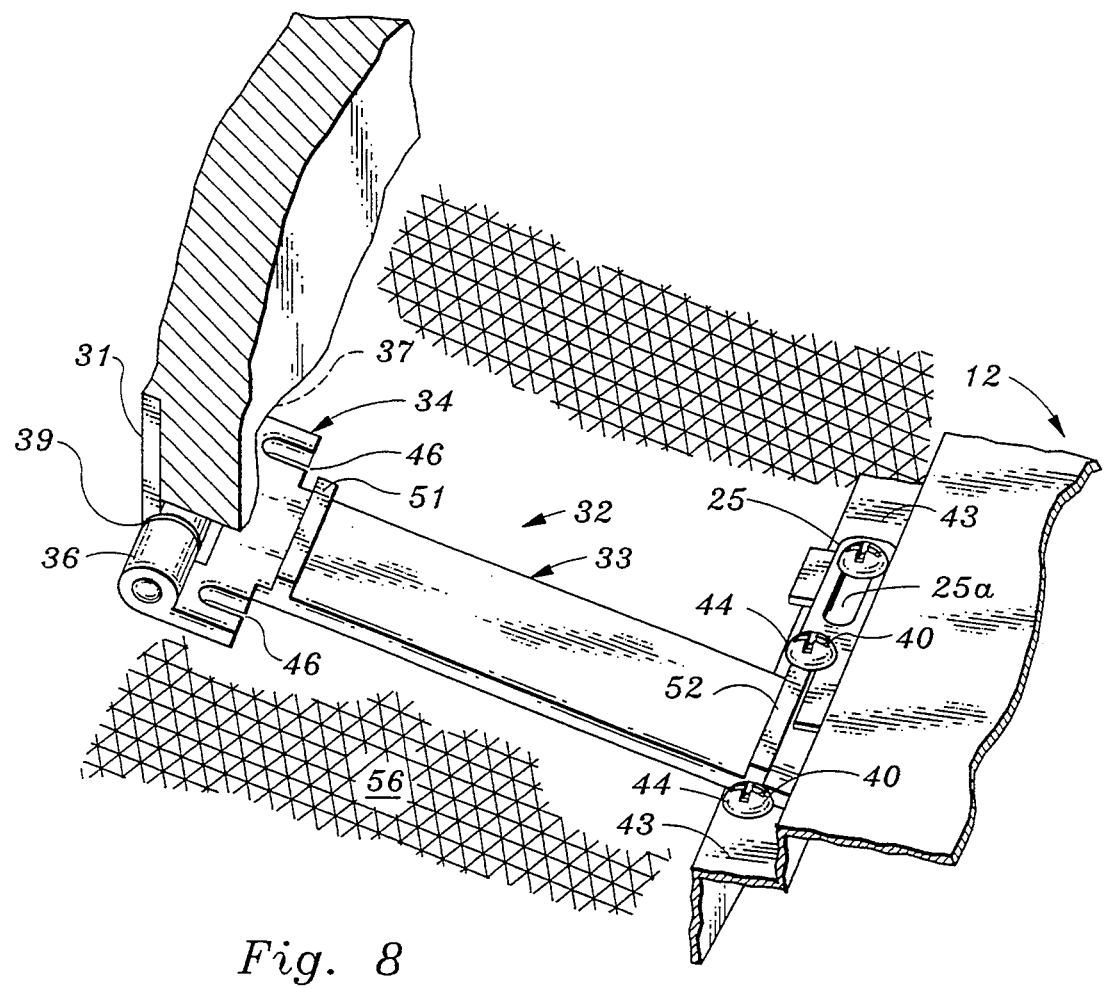
FIG. 8 is a fragmentary isometric view to an enlarged scale, taken from above the horizontal mesh panel and looking rearwardly and downwardly at an angle toward the T-hinge leaf in maximum projected location with the sliding latch bar in closed position, with a portion of the horizontal mesh panel being broken away to disclose underlying structural details.

When the aerodynamic feature of the invention is not being used, the elongated tongue 33 of the T-hinge 32 is translated forwardly as far as it will go through a close-fitting registering opening 41 in a narrow vertical flange 42 located adjacent the after end 17 of the cargo bed 12 and assumes the forwardly retracted location shown best in FIGS. 6 and 7.

Once the T-hinge is located in forwardly retracted position, as appears in FIG. 6, the transverse mounting plate 34 is secured to the bed 12 by clamping the plate 34 to a narrow horizontal shelf 43 forming the extreme after end 17 of the bed 12. Clamping is effected by tightening a pair of machine screws 44 screwed into the bed shelf 43. The threaded stems 35 or shanks, of the screws 44 are embraced by the walls of a pair of semicircular recesses 46 in the transverse mounting plate 34. Further security is afforded by a transversely slidable latch 47 including an arcuate notch 48 with walls adapted to engage the threaded stem 35 of the adjacent one only of the machine screws 44 and to underlie the head 40 thereof so as to be clamped by the head when the machine screw 44 is tightened. The head 40 of the machine screw 44 remote from the arcuate notch 48 clamps directly down on the mounting plate 34. The latch 47 is restrained to travel in the desired path by a screw 25 confined in a slot 25a formed in the latch 47 and by a bracket 25b. If desired the screw 25 can also be tightened.

Adjacent the arcuate notch 48 is a latch bar 49 which, when the latch 47 is in closed location, overlies the base 50 of the tongue 33 and laterally abuts, in interfering relation, the adjacent wall of an upwardly projecting transverse ledge 51, or protuberance, formed on the tongue 33 adjacent the tongue's base 50. The protuberance 51 in conjunction with the latch bar 49 provide a limit stop structure preventing rearward movement of the T-hinge 32.

With the T-hinge 32 in fully retracted or forward-most position and locked, as just disclosed, and with the two hinge knuckles 36 in aligned, and in assembled position relative to the hinge knuckle 39 projecting forwardly from the tailgate leaf 31 mounted on the bottom 20 of the tailgate 18, the tailgate can be opened and closed in the usual fashion.

In open, or horizontal, position of the tailgate, the customary pivoted struts 45 pivotably mounted on the ends 21 of the tailgate and pivotably connected to the adjacent stub walls 16 sturdily support the tailgate.

When the tailgate is to be placed in aerodynamic mode, the tailgate is first swung up, or lifted, and urged into vertical, locked position, the tailgate locking members 28 and 29 interengaging and serving to secure the top of the tailgate. As previously explained, the members 28 and 29 provide a pair of horizontally aligned pivots which allow the bottom 20 of the tailgate to be pivoted toward the rear after the forwardly retracted T-hinges 32 have been released from their confinement.

In order to release each of the T-hinges 32 from its forwardly retracted position it is merely necessary to unscrew the machine screws 44 (and the screw 25, if tight) a half turn, or so, until the latch 47 and the transverse mounting plate 34 are unclamped by the heads 40 of the machine screws 44. This allows the latch 47, including the latch bar 49 and the portion of the latch carrying the arcuate notch 48, to be translated away from the tongue base 50 and the left-hand one of the machine screws 44, respectively. The T-hinge 32 is then free to be moved rearwardly.

When both of the T-hinges 32 are released, as just explained, the bottom 20 of the tailgate 18 can be moved rearwardly along with the T-hinges 32 until a pair of raised parallel ledges 52 and 53 separated by a channel 54 near the forward ends of the elongated tongues 33 appear through the opening 41 in the transverse vertical flange 42 on the rear end 17 of the cargo bed 12.

The bottom 20 of the tailgate 18 can then be jockeyed slightly fore or aft so that the transverse channel 54 in each of the elongated tongues 33 is in register with the respective one of the slidable latch bars 49, at which juncture the slidable latches 47 are again translated so that the latch bars 49 move through and overlie the respective channels 54 on top of the tongues 33. Concurrently, the walls of the arcuate notch 48 of each of the sliding latches 47 embrace the threaded stem 35 of the left-hand one of the machine screws 44 so that when the machine screws are tightened, the heads 40 of the machine screws securely clamp the sliding latches 47 including the latch bars 49.

Since the facing vertical walls of the two parallel raised ledges 52 and 53 closely abut the interposed well-secured latch bar 49, the elongated tongue 33 and thus the T-hinge 32 is immobilized. The latch bar 49 serves as a limit stop preventing fore and aft movement of the tongue 33 and the T-hinge 32 and the side walls of the opening 41 in the vertical flange 42 on the after end of the cargo bed 12 prevent lateral movement of the snugly interposed portion of the elongated tongue 33.

With the bottom of the tailgate securely propped open, as appears in FIG. 1, it becomes expedient to cover the gap 55 between the after end 17 of the bed 12 and the bottom 20 of the tailgate 18 with a panel 56 of strong porous material such as expanded metal or hardware cloth, cut to fit the transversely elongated space. Preferably, the opposite ends of the rectangular mesh-like panel 56 are mounted on a pair of fore and aft oriented light-gauge, L-shaped-in-section metal channels 57.

The upturned leg of each of the channels 57 also serves to support a triangular mesh panel 58 shaped and sized so as to cover the open triangular space 59 defined by an end 21 of the inclined tailgate 18 and the adjacent portion of the stub wall 16.

The weight of the mesh panels 56 and end channels 57 is supported by the two fore and aft elongated tongues 33 spanning the distance between the after end 17 of the bed 12 and the bottom 20 of the tailgate 18. It might be noted that while it would be possible to add some form of hold down device to bear down on the mesh panel 56 and the fore and aft channels 57 and thus minimize vibration and rattling, applicant has not found, in practice, that such an accessory is necessary.

Applicant has found, however, that additional gas mileage and improved vehicle handling characteristics, particularly at higher speeds, have resulted from reducing tailgate "wind drag" by installing the present device in the manner disclosed.

If, for any reason, it is desired to restore the tailgate to the customary mode, it is merely necessary to remove the mesh panel 56, unscrew the machine screws 44 far enough to allow the latch bars 49 to be translated to unlocked position and push the bottom 20 of the tailgate 18 forwardly to vertical, closed position so that the walls of the semicircular recesses 46 embrace the machine screws 44 and the tongue bases 50 are again in register with the bars 49 . Then, by translating the latch bars 49, as before, so as to overlie the bases 50 of the tongues 33 followed by tightening the machine screws 44, and the screw 25, if desired, the reconversion to customary operation of the tailgate is completed. The time required is but a few minutes.

Figure 4:
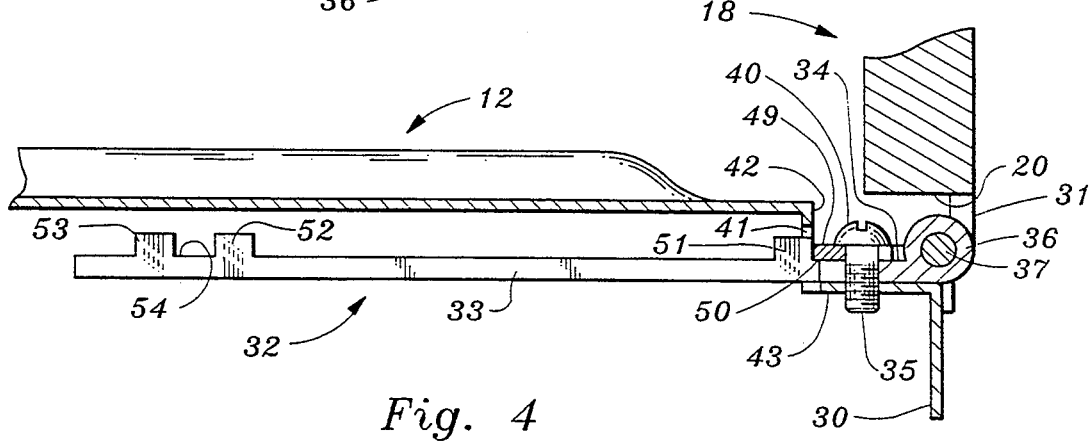
FIG. 4 is a fragmentary longitudinal sectional view of the T-shaped hinge leaf secured in forwardly retracted position below the after end portion of the cargo bed.
Figure 5:
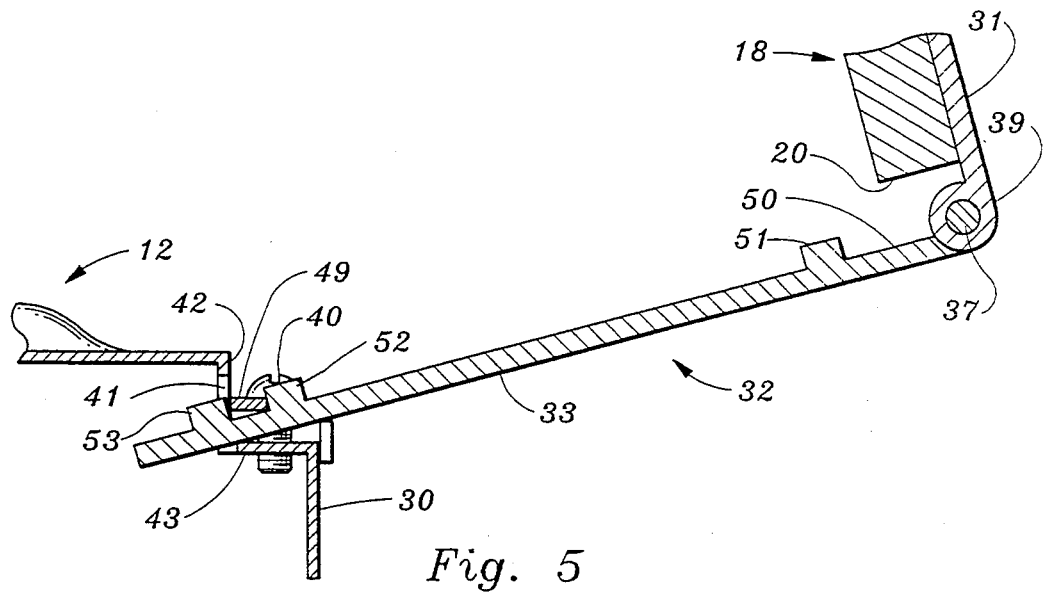
FIG. 5 is a fragmentary median longitudinal sectional view of the T-shaped hinge leaf secured in open position, taken on the line 5—5 in FIG. 1, the mesh panel being omitted for purposes of clarity.

Some pickup owners save even more time by securing the left hand one of the machine screws 44 (as appears in FIGS. 6 and 7) in a fixed vertical position, as by a lock nut, or other expedient, so that the bottom surface of the screw head 40 remains at a height such that when the latch bar 49 is translated in a right hand direction, the top surface of the latch bar 49 frictionally engages the bottom surface of the screw head 40. This snug fit is sufficient to retain the latch bar 49 in engaged position, as in FIG. 7 yet permits the latch bar 49 to be disengaged when a mode change needs to be made. Preferably, a leaf spring (not shown) is interposed between the bottom surface of the slidable latch 47 in the vicinity of the screw 25 and the upper surface of the shelf 43 so that upward spring urgency forces the top surface of the latch 47 against the bottom surfaces of the head of the machine screw 25 and the head 40 of the left-hand one of the machine screws 44, thereby increasing frictional resistance and securely holding the latch 47 in engaged, or locked, position whether the T-shaped hinge leaf is in forward location as in FIG. 4 or in after location as in FIG. 5.

What is claimed is:

1. An aerodynamically improved tailgate construction for use on a pickup truck having a fore and aft elongated cargo bed terminating at an after end, a pair of upstanding side walls extending in a fore and aft direction on opposite lateral sides of the cargo bed and a tailgate transversely spanning the after ends of the side walls, the tailgate having a hinged bottom for removable connection to the after end of the cargo bed and upper corner portions adapted for both a holding and a pivotable connection to the adjacent side walls, said tailgate construction comprising:

a. at least one pair of T-shaped hinge leaves each including a transverse mounting plate carrying at least one knuckle and an elongated longitudinal tongue having an axis at right angles to the axis of said knuckle, said T-shaped hinge leaves being movable between a forward location in which the after end portion of said tongue is substantially coextensive with the after end of the cargo bed and an after location in which the forward end portion of said tongue is substantially coextensive with the after end of the cargo bed;

b. latch means on the after end of the cargo bed for selectively securing said T-shaped hinge leaves either in said forward location or in said after location;

c. pin means for connecting said T-shaped hinge leaves to the hinged bottom of the tailgate so that in said forward location of said T-shaped hinge leaves the tailgate can be moved between an open horizontal attitude and a closed vertical attitude and in said after location of said T-shaped hinge leaves the tailgate is inclined downwardly and rearwardly from the top of the tailgate so that the bottom of the tailgate is separated from the after end of the cargo bed by a gap and the opposite ends of the tailgate are each separated from the respective adjacent after ends of the side walls by a space; and, d. a panel of porous material sized and shaped to span the gap and provide airflow therethrough.

2. A tailgate construction as in claim 1 including a second panel and a third panel of porous material sized and shaped to cover the respective one of the spaces and provide airflow therethrough.

3. A tailgate construction as in claim 2 in which said latch means includes a pair of latch bars slidably mounted on the after end of the bed for transverse movement between a locked position in which each of said latch bars overlies a respective one of said tongues and an unlocked position in which each of said latch bars is removed from the respective one of said tongues.

4. A tailgate construction as in claim 3 in which each of said tongues includes an after limit stop protuberance mounted on said tongue immediately forward of said latch bar in said forward location of said T-shaped hinge leaves and in locked position of said latch bar.

5. A tailgate construction as in claim 4 in which each of said tongues includes a forward limit stop mounted on said tongue, said limit stop being in interfering relationship with said latch bar in said after location of said T-shaped hinge leaves and effective to prevent fore and aft movement of said T-shaped hinge leaves in locked position of said latch bar.

6. A tailgate construction as in claim 5 in which said forward limit stop includes a pair of protuberances separated by a distance substantially equal to the fore and aft dimension of said latch bar so that in locked location of said latch bar, said protuberances snugly confine said latch bar.

7. A tailgate construction as in claim 6 in which said protuberances include a pair of parallel ridges straddling said latch bar in locked location thereof.

8. A tailgate construction as in claim 7 in which each of said T-shaped hinge leaves includes a transverse mounting plate on the after end of said elongated tongue, said mounting plate including a pair of semicircular recesses formed along the forward edge thereof, a pair of machine screws each having a head and a threaded stem, said machine screws being threadably mounted on the after end of said bed and located for register with said recesses so that as the walls of said recesses embrace said threaded stems of said screws and said screws are tightened, said screw heads engage, clamp and immobilize said T-shaped hinge leaf.

9. A tailgate construction as in claim 8 in which said latch bar includes a portion carrying an arcuate notch in register with one of said machine screws so that when said latch bar is in locked location, the walls of said arcuate notch embrace the threaded stem of said one of said machine screws and said arcuately notched portion of said latch bar is clamped and immobilized by the head of said one of said machine screws when said screws are tightened.

10. A tailgate construction as in claim 8 in which the bottom surfaces of said screw heads are positioned at different predetermined heights above the after end of said bed so that one of said screw heads frictionally engages the subjacent surface of said T-shaped hinge leaf in said forward location thereof and the other of said screw heads frictionally engages the subjacent surface of said latch bar in said forward location of said T-shaped hinge leaf and said locked position of said latch bar.

* * * * *